United States Patent [19]

Hwang

[11] Patent Number: 5,259,679
[45] Date of Patent: Nov. 9, 1993

[54] CONSTANT FORCE SPRING SYSTEM FOR RIBBON CARTRIDGES

[76] Inventor: Paul C. Hwang, 1650 S. 308th St. Apt. 17, Federal Way, Wash. 98003

[21] Appl. No.: 819,053

[22] Filed: Jan. 10, 1992

Related U.S. Application Data

[63] Continuation-in-part of Ser. No. 786,848, Nov. 1, 1991, abandoned.

[51] Int. Cl.⁵ .............................................. B41J 33/14
[52] U.S. Cl. .................................. 400/234; 267/166; 400/242
[58] Field of Search ............. 400/234, 208, 242, 248, 400/248.1, 208.1, 250, 693.1; 242/73.3, 73.43, 73.45, 197, 199; 267/166, 170, 171, 172, 173, 154, 155

[56] References Cited

U.S. PATENT DOCUMENTS

| | | | |
|---|---|---|---|
| 4,367,052 | 1/1983 | Steger | 400/208 |
| 4,986,678 | 1/1991 | Hwang | 400/208 |
| 4,990,008 | 2/1991 | Hwang | 400/208 |
| 4,998,833 | 3/1991 | Chiman | 400/208 |

FOREIGN PATENT DOCUMENTS

| | | | |
|---|---|---|---|
| 0019478 | 1/1987- | Japan | 400/234 |
| 0205273 | 8/1988 | Japan | 400/234 |

Primary Examiner—Edgar S. Burr
Assistant Examiner—Lynn D. Hendrickson
Attorney, Agent, or Firm—Christensen, O'Connor, Johnson & Kindness

[57] ABSTRACT

A V-shaped spring system has opposite ends formed by first and second arms and a pair of intermediate coil springs joined by a bridge. One of the coil springs pivotally receives a fixed axle, and the first arm extends from each spring. The second arms extends from the other spring. The spring operates to exert a substantially constant and limited force when the first arm is moved through an angle of up to 90°.

15 Claims, 2 Drawing Sheets

CONSTANT FORCE SPRING SYSTEM FOR RIBBON CARTRIDGES

CROSS-REFERENCE

This application is a continuation-in-part of application Ser. No. 07/786,848, filed on Nov. 1, 1991, now abandoned which is hereby expressly incorporated by reference herein.

BACKGROUND OF THE INVENTION

The present invention relates to a constant pressure spring particularly adapted for ribbon cartridges of the type commonly used in typewriters and printers. More particularly, the present invention relates to a ribbon cartridge having a V-shaped spring including two arms, a bridge and a pair of coil springs, for exerting a substantially constant and limited force and load on one of the arms even though such arm is moved through an angle of up to 90°.

Generally, force applied by a coil spring having two arms is increased when the angle between the two arms of the spring is decreased by moving one of the arms. As the angle between the arms varies due to movement of one arm, it is very difficult to exert a constant force and load on an element engaged or carried by the spring.

Various types of coil spring systems having only one coil spring and two arms are well known in the art as shown in U.S. Pat. Nos. 4,986,678; 4,990,008; and 4,998,833. However, such prior art coil spring systems suffer from difficulty in exerting a constant force and load when the angle between the two arms changes, as, for example, when used ink ribbon winds on a take-up spool from a feed spool of a ribbon cartridge and the effective diameter of the take-up spool holding the used ink ribbon increases. Therefore, such spring systems require additional installations for exerting a constant force and load.

In order to avoid the above problems, U.S. Pat. No. 4,367,052 to Steger discloses a flat spring including a length of resilient material which has terminal end portions and a central body portion. However, the spring of this patent is complicated in structure and is difficult to use in typewriter cartridges.

SUMMARY OF THE INVENTION

Accordingly, it is an object of the present invention to provide a constant pressure spring system particularly adapted for ribbon cartridges which eliminates the above problems encountered in a conventional coil spring.

Another object of the present invention is to provide a spring system including a length of resilient material which has two arms, a bridge and a pair of coil springs, for exerting a substantially constant and limited force and load on one of the arms when the other arm is moved through an angle of up to 90°.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a constant pressure spring particularly adapted for ribbon cartridges having a V-shaped configuration and including first and second arms and a pair of coil springs, the pair of springs being connected by a bridge. One of the coil springs is pivotally journalled on a fixed axle and the first arm extends therefrom. The other coil spring has the second arm extending therefrom. This system maintains a substantially constant and limited load on the second arm when the first arm is moved through an angle up to 90°.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
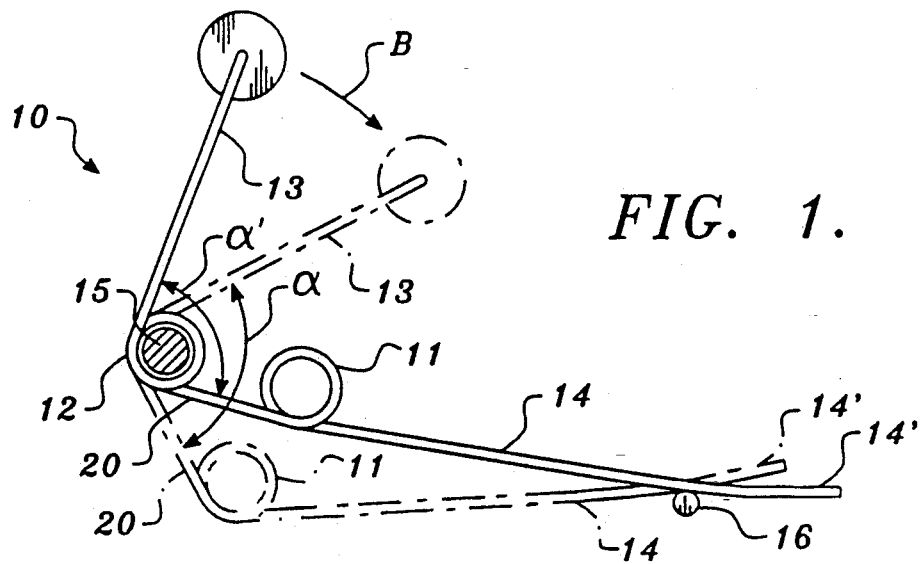
FIG. 1 is a front elevation of the constant force spring of the present invention.

Referring now in detail to the drawings for the purpose of illustrating the preferred embodiments of the present invention, the constant pressure spring 10 as shown in FIG. 1 includes a first coil spring 12, and a second coil spring 11 connected to the first coil spring 12 by an integral bridge section 20. A first arm 13 extends from the first coil spring 12, generally oppositely from the bridge 10, and a second arm 14 extends from the second coil spring 11. The first coil spring 12 is slidably fitted on a fixed axle 15. Usually, movement of the second arm 14 is limited by a spring stop 16. The free end portion 14' of second arm 14 extends beyond the stop 16. The constant pressure spring 10 is preferably made of a single length of resilient material.

According to the present invention, the constant pressure spring 10 operates as follows:

When force is applied to the first arm 13 in the direction of the arrow B in FIG. 1, such arm swings downward in the direction indicated by the arrow from the more erect position indicated in solid lines to the position indicated in broken lines. Simultaneously, the bridge 20, second coil spring 11 and second arm 14 are moved from the positions shown in solid lines to the positions shown in broken lines, and also the free end portion 14' of second arm 14 is moved from the position shown in solid lines to the position shown in broken lines. In the broken line position, the angle $\alpha$ of the first arm 13 to the bridge 20 is equal to the angle $\alpha'$ of the arm to the bridge prior to being swung (solid lines). Therefore, the force applied by the second arm 14 when in the broken line, swung position is the same as the force applied when the arm is in the solid line, starting position.

In order to ensure that the force applied by the second arm in the swung (broken line) position is the same as the force applied by the second arm in the starting (solid line) position, the constant pressure spring 10 can be constructed by controlling one pair of parameters of a total of three pairs of parameters. The three pairs of parameters are: (1) length of the bridge 20 and length of the second arm 14 to spring stop 16; (2) diameter of the coils of first coil spring 12 and diameter of the coils of second coil spring 11; and (3) number of coils in first coil spring 12 and number of coils in second coil spring 11.

The constant pressure spring 10 will function properly to apply a constant force in each of the following situations: in the first situation, the length of bridge 20 is selected to be less than the length of second arm 14 up to spring stop 16. At the same time, first coil spring 12 may have the same coil diameter or a smaller coil diameter than second coil spring 11, and first coil spring 12 may have fewer or the same number of coils as second coil spring 11. In the second situation, the first coil spring 12 is selected to have a smaller coil diameter than second coil spring 11. At the same time, the length of bridge 20 may be equal to or less than the length of second arm 14 up to spring stop 16, and first coil spring 12 may have fewer or the same number of coils as second coil spring 11. In the third situation, the first coil spring 12 is selected to have fewer coils than second coil spring 11. At the same time, the length of bridge 20 may be equal to or less than the length of arm 14 up to spring stop 16, and first coil spring 12 may have the same coil diameter or a smaller coil diameter than second coil spring 11.

The movement of the second coil spring 11 is also dependent on the resilient material from which the spring is made. It should be noted that the spring of the present invention may be made from any commonly used spring material with a temper sufficient to permit the wire to yield. Some typical spring wire materials are music wire, high carbon wire and hard drawn wire, but the present invention is not limited to the specific examples. Also, nonresilient plastic materials can be substituted for the resilient material from the free end of first arm 13 to the middle part of the bridge 20.

Figure 2:
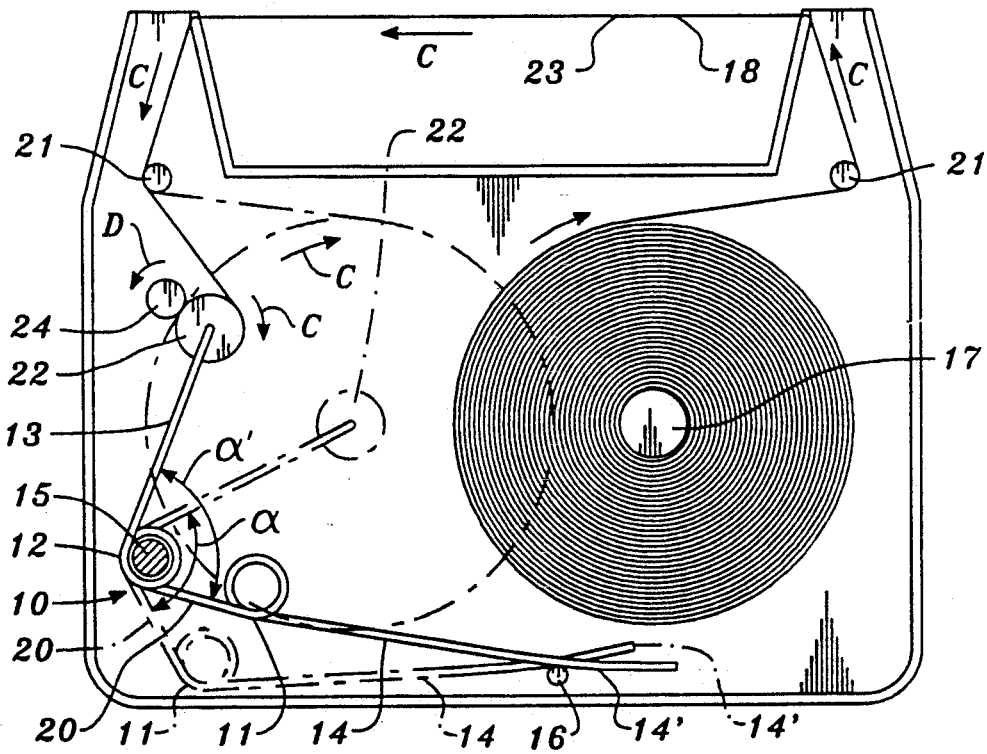
FIG. 2 is a front elevation of the constant pressure spring adapted for a cartridge according to the present invention.
Figure 3:
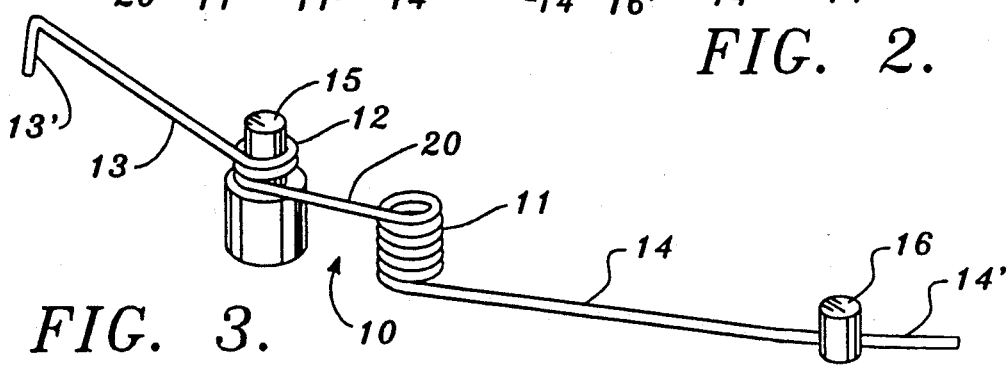
FIG. 3 is a perspective of the constant pressure spring of FIG. 2 of the present invention.

FIGS. 2 and 3 show the constant pressure spring 10 as used in a ribbon cartridge. The cartridge housing 18 includes a feed spool 17, a take-up spool 22, a drive roller 24 adjacent to the take-up spool 22, and a plurality of guide pins 21 for guiding an ink ribbon 23 from the feed spool 17 to the take-up spool 22. The fixed axle 15 and spring stop 16 are fixed on an inner surface of the base of the housing 18, and an end 13' (FIG. 3) of the first arm is bent perpendicularly downward and is used as a shaft for the take-up spool.

The drive roller 24 is driven in the direction indicated by arrow D shown in FIG. 2. The drive roller 24 contacts take-up spool 22 and drives the take-up spool in the direction indicated by arrows C in FIG. 2. As the ribbon 23 unwinds from feed spool 17, it is wound onto the take-up spool 22. At the same time, the winding spool 22 is forced away from the drive roller 24 by the accumulated ribbon wound on the take-up spool. However, the drive roller 24 continues to drive the take-up spool 22 through the accumulated ink ribbon. At the same time, the constant pressure spring operates as described above in reference to FIG. 1, and the first arm 13, second coil spring 11, bridge 20 and second arm 14 are moved toward the positions indicated in broken lines. As a result, the force applied by the first arm 13 does not increase due to the displacement of the take-up spool 22, and the drive mechanism of the ribbon cartridge is protected from damage.

Figure 4:
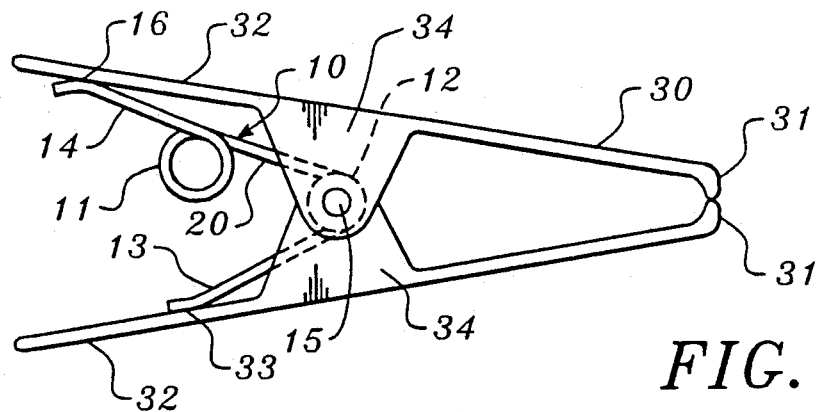
FIG. 4 is a side elevation of a clip having a constant force spring.
Figure 5:
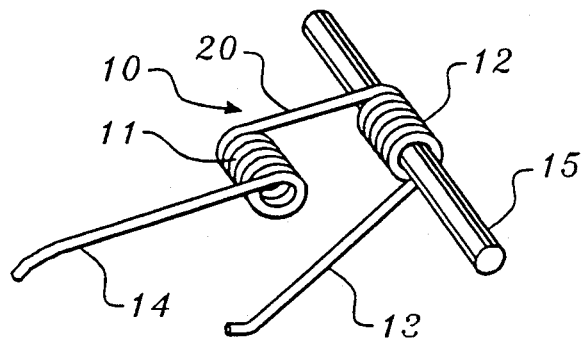
FIG. 5 is a top perspective of the spring used in the clip of FIG. 4.

FIG. 4 and FIG. 5 show a multipurpose clip having a spring 10 of the type used in the typewriter cartridge previously described. Clip 30 has a pair of handles 32, a pair of jaws 31 extending from the handles 32, a pair of middle extensions extending from the handles 32, and a fixed axle 15 extending through the middle extensions 34 for pivotally receiving the first coil spring 12 of the constant force spring 10. The constant force spring 10 further includes the second coil spring 11, bridge 20, first and second arms 13 and 14, and spring stop 16. The constant force spring operates as described above with reference to FIG. 1, such that the clamping power of the jaws 31 remains constant.

Figure 6:
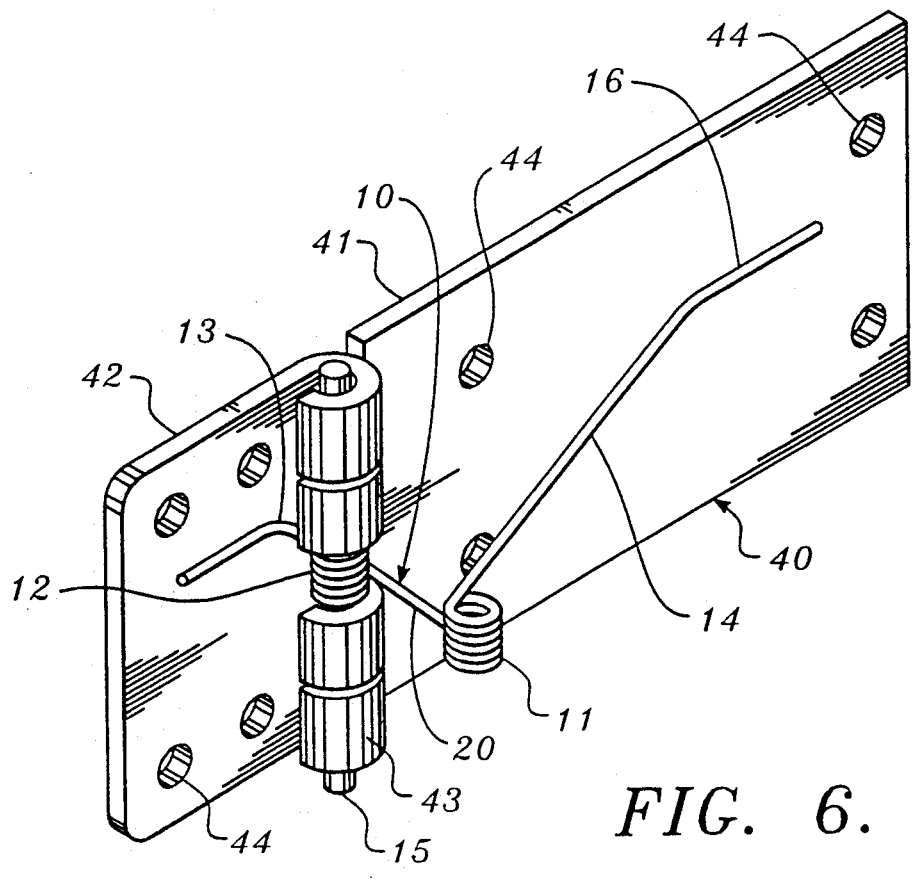
FIG. 6 is a top perspective of a hinge having a constant force spring.

FIG. 6 shows a hinge 40 having a constant force spring of the type previously described. Hinge 40 has a pair of doorpost and door flanges 41 and 42. Each flange has a plurality of apertures 44. The fixed hinge axle or pintle 15 slidably receives the first coil spring 12 of the constant force spring 10. The constant force spring 10 includes the second coil spring 11, the first and second arms 13 and 14 and the spring stop 16. The constant force spring operates as described above with reference to FIG. 1, such that the effort required to open or close a door (not shown) is constant so long as the angle between the first arm 13 and second arm 14 is between 0° and 90°.

The invention being thus described, it will be obvious that the same may be varied in many ways. Such variations are not to be regarded as a departure from the sprit and scope of the invention, and all such modifications as would be obvious to one skilled in the art are intended to be included in the scope of the following claims.

What is claimed is:

1. A ribbon cartridge for typewriters, printers or the like comprising a housing having a stationary spring stop, a rotatable feed spool mounted in said housing, a rotatable take-up spool mounted in said housing, a ribbon having opposite end portions, one of said ribbon end portions being wound on said feed spool and the other of said ribbon end portions being wound on said take-up spool, means for driving said ribbon for unwinding from said feed spool in coordination with winding of said ribbon on said take-up spool, said driving means including a drive roller adjacent to said take-up spool, said take-up spool being movable in said housing relatively toward and away from said drive roller, and elongated spring means for biasing said take-up spool relatively toward said drive roller for driving engagement of said drive roller against said ribbon end portion wound on said take-up spool, said elongated spring means including an intermediate portion having a first coil spring, a second coil spring and an elongated bridge section extending between and connecting said first and second coil springs, said coil springs being offset from the axes of rotation of said spools, said elongated spring means further including a first arm portion extending from said first coil spring toward said take-up spool for application of force to said take-up spool and a second arm portion extending from said second coil spring into engagement with said spring stop for application of reaction force to said elongated spring means.

2. The cartridge defined in claim 1, in which the second arm portion is slidable along the spring stop.

3. The cartridge defined in claim 1, in which the bridge section is shorter than the distance from the second coil spring to the spring stop.

4. The cartridge defined in claim 1, in which the first coil spring is mounted for rotation about an axis stationary relative to the housing.

5. The cartridge defined in claim 1, in which the second coil spring is offset from the feed spool and the take-up spool.

6. The cartridge defined in claim 1, in which the first coil spring is offset from the feed spool and the take-up spool.

7. The cartridge defined in claim 1, in which the first coil spring and the second coil spring both are offset from the feed spool and the take-up spool.

8. The cartridge defined in claim 1, in which the bridge section and second arm portion extend generally oppositely from the second coil spring and the second coil spring is movable relative to the housing by swinging of the bridge section and the second arm portion.

9. A ribbon cartridge for typewriters, printers or the like comprising a housing, a feed spool mounted in said housing, a take-up spool mounted in said housing, a ribbon having opposite end portions, one of said ribbon end portions being wound on said feed spool and the other of said ribbon end portions being wound on said take-up spool, means for driving said ribbon for unwinding from said feed spool in coordination with winding of said ribbon on said take-up spool, said driving means including a drive roller adjacent to said take-up spool, said take-up spool being movable in said housing relatively toward and away from said drive roller, and elongated spring means for biasing said take-up spool relatively toward said drive roller for driving engagement of said drive roller against said ribbon end portion wound on said take-up spool, said elongated spring means having opposite end portions including a first arm portion for applying force to said take-up spool and a second arm portion at the end portion of said spring means opposite said first arm portion, said elongated spring means including an intermediate portion extending between said first and second arm portions, said intermediate portion having a first component carried by said first arm portion and pivotally mounted on said housing, an elongated bridge section extending from said first component generally oppositely from said first arm portion and a second component in the form of a coil spring carried by said bridge section spaced from said first component at a location offset from said spools, said second arm portion extending from said coil spring generally oppositely from said elongated bridge section.

10. The cartridge defined in claim 9, in which the housing includes a stationary spring stop engaged by the second arm portion for application of reaction force to the elongated spring means.

11. The cartridge defined in claim 10, in which the second arm portion is slidable along the spring stop.

12. The cartridge defined in claim 9, in which the first component is a first coil spring offset from the feed spool and the take-up spool and the coil spring carried by said bridge section is a second coil spring.

13. The cartridge defined in claim 9, in which the first component is pivotable about an axis stationary relative to the housing, the second component being movable relative to the housing by swinging movement of the bridge section and the second arm portion extending from said second component.

14. The cartridge defined in claim 9, in which the feed spool is mounted in the housing for rotation about an axis stationary relative to the housing.

15. A ribbon cartridge for typewriters, printers or the like comprising a housing, a feed spool mounted in said housing for rotation about an axis stationary relative to said housing, a rotatable take-up spool mounted in said housing, a ribbon having opposite end portions, one of said ribbon end portions being wound on said feed spool and the other of said ribbon end portions being wound on said take-up spool, means for driving said ribbon for unwinding from said feed spool in coordination with winding of said ribbon on said take-up spool, said driving means including a drive roller adjacent to said take-up spool, said take-up spool being movable in said housing relatively toward and away from said drive roller, and elongated spring means for biasing said take-up spool relatively toward said drive roller for driving engagement of said drive roller against said ribbon end portion wound on said take-up spool, said elongated spring means having opposite end portions including a first arm portion and a second arm portion, one of said arm portions being effective for applying biasing force to said take-up spool, said housing having a stationary spring stop positioned for engagement by the other of said arm portions for application of reaction force to said elongated spring means, said elongated spring means including an intermediate portion extending between said first and second arm portions, said intermediate portion having a first coil spring pivotally mounted on said housing at a location offset from said feed spool and said take-up spool, an elongated bridge section extending from said first coil spring and a second coil spring carried by said bridge section at a location remote from said first coil spring and offset from said feed spool and said take-up spool, said first arm portion extending from said first coil spring generally oppositely from said bridge section, and said second arm portion extending from said second coil spring generally oppositely from said bridge section.

* * * * *